(12) United States Patent
Chang et al.

(10) Patent No.: US 8,390,965 B2
(45) Date of Patent: Mar. 5, 2013

(54) OVER-CURRENT PROTECTION DEVICE FOR MULTIPLE HIGH-VOLTAGE MOTIVE DEVICES AND METHOD THEREOF

(75) Inventors: Chih-Ming Chang, Taipei County (TW); Ju-Chou Chen, Taipei County (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 332 days.

(21) Appl. No.: 12/873,306

(22) Filed: Aug. 31, 2010

(65) Prior Publication Data

US 2010/0321839 A1    Dec. 23, 2010

Related U.S. Application Data

(63) Continuation-in-part of application No. 12/216,657, filed on Jul. 9, 2008, now abandoned.

(30) Foreign Application Priority Data

May 7, 2008  (TW) .............................. 97116753 A
Aug. 2, 2010  (TW) .............................. 99125605 A (51) Int. Cl.
*H02H 11/00*    (2006.01)
(52) U.S. Cl. .............. 361/31; 361/18; 361/30; 318/432; 318/434; 323/274; 323/284; 323/277; 323/280; 323/281
(58) Field of Classification Search .................. 318/432, 318/433, 434, 34, 71, 400.04, 400.06, 400.12, 318/400.22, 635, 474, 714, 442, 108; 702/292, 702/522; 324/500, 522, 414; 361/31, 57, 361/65, 87, 91.1, 93.1, 18, 30; 323/274, 323/284, 277, 280, 281

See application file for complete search history.

(56) References Cited

U.S. PATENT DOCUMENTS

| 4,227,230 | A  | * | 10/1980 | Bray .............................. 361/152 |
| 4,452,136 | A  | * | 6/1984  | Boynton et al. ............ 101/93.05 |
| 4,487,121 | A  | * | 12/1984 | Carrington et al. ........ 101/93.14 |
| 4,701,155 | A  | * | 10/1987 | Ott .................................. 493/14 |
| 5,751,123 | A  | * | 5/1998  | Coy et al. ......................... 318/34 |
| 7,049,784 | B2 | * | 5/2006  | Suzuki ........................... 318/636 |
| 7,173,386 | B1 | * | 2/2007  | Jeon ................................. 318/53 |
| 7,504,784 | B2 | * | 3/2009  | Asada et al. ..................... 318/51 |

* cited by examiner

*Primary Examiner* — Rita Leykin
(74) *Attorney, Agent, or Firm* — Jianq Chyun IP Office (57) ABSTRACT

An over-current protection device for multiple high-voltage motive devices is provided. The over-current protection device includes a comparison module and a logic operation module. The comparison module receives a plurality of voltages generated from a plurality of operating currents of a plurality of high-voltage motive devices and respectively compares the voltages with at least one reference voltage to generate a plurality of comparison results, wherein the high-voltage motive devices are solenoids, electronic clutches, or a combination of solenoids and electronic clutches. The logic operation module receives the comparison results and generates at least one control signal for a plurality of high-voltage motive device driving circuits according to the comparison results. The high-voltage motive device driving circuits respectively drive the high-voltage motive devices according to the control signal.

16 Claims, 6 Drawing Sheets

FIG. 7

OVER-CURRENT PROTECTION DEVICE FOR MULTIPLE HIGH-VOLTAGE MOTIVE DEVICES AND METHOD THEREOF

CROSS-REFERENCE TO RELATED APPLICATION

This is a continuation-in-part application of patent application Ser. No. 12/216,657 filed on Jul. 9, 2008, which claims the priority benefit of Taiwan patent application serial no. 97116753, filed May 7, 2008 and is now pending. This application also claims the priority benefits of Taiwan application serial no. 99125605, filed on Aug. 2, 2010. The entirety of each of the above-mentioned patent applications is hereby incorporated by reference herein and made a part of this specification.

BACKGROUND OF THE INVENTION

1. Field of the Invention

The present invention generally relates to a printing device, and more particularly, to an over-current protection device for multiple high-voltage motive devices and a method thereof, wherein the high-voltage motive devices in a printing device are protected at the same time.

2. Description of Related Art

A plurality of high-voltage motive devices is usually disposed in a multifunction printer (MFP) for converting electric power into mechanical power such that the printing operations can be successfully carried out. The high-voltage motive devices may be solenoids or electronic clutches. However, when a MFP fails or an instantaneous mis-operation occurs (for example, a paper jam causes various elements to stop working), the high-voltage motive devices and the power supply circuit thereof may continue to receive a high voltage or current and accordingly be damaged. In a worst-case scenario, the damage of the high-voltage motive devices may be spread to other elements and even cause the entire MFP to get burnt.

Conventionally, sheet metals are installed on the high-voltage motive devices of a MFP to prevent the damage of the high-voltage motive devices from spreading to other elements. However, the fabrication cost of the MFP is increased by installing the sheet metals, and the high-voltage motive devices and the power supply circuit thereof cannot be protected in real time. Thus, a protection circuit that can protect high-voltage motive devices (for example, solenoids or electronic clutches) when a failure occurs is to be provided such that the high-voltage motive devices can be prevented from being burnt and the fabrication cost of the MFP can be reduced.

SUMMARY OF THE INVENTION

The present invention provides an over-current protection device for multiple high-voltage motive devices. The over-current protection device includes a comparison module and a logic operation module. The comparison module receives a plurality of voltages generated from a plurality of operating currents of a plurality of high-voltage motive devices and respectively compares the voltages with at least one reference voltage to generate a plurality of comparison results, wherein the high-voltage motive devices are a plurality of solenoids, a plurality of electronic clutches, or a combination of solenoids and electronic clutches. The logic operation module receives the comparison results and generates at least one control signal for a plurality of high-voltage motive device driving circuits according to the comparison results. The high-voltage motive device driving circuits respectively drive the high-voltage motive devices according to the control signal.

According to an embodiment of the present invention, the over-current protection device further includes a main power control module. The logic operation module further generates a main power control signal for the main power control module according to the comparison results. The main power control module generates a main power off control signal for a main power circuit according to the main power control signal so that the main power circuit turns off a multiple high-voltage motive device voltage source supplied by the main power circuit according to the main power off control signal.

According to an embodiment of the present invention, the over-current protection device includes an integrator and a comparator. The integrator receives the main power control signal and generates an integrated voltage. The comparator receives a predetermined voltage and the integrated voltage and compares the integrated voltage with the predetermined voltage to generate the main power off control signal.

According to an embodiment of the present invention, when the voltage generated from the operating current of one of the high-voltage motive devices is greater than the reference voltage, the logic operation module outputs the control signal to turn off one, all, or a part of the high-voltage motive devices, or the main power control module turns off the high-voltage motive device voltage source supplied by the main power circuit.

The present invention provides an over-current protection method for multiple high-voltage motive devices. First, a plurality of voltages generated from a plurality of operating currents of a plurality of high-voltage motive devices is received, wherein the high-voltage motive devices are a plurality of solenoids, a plurality of electronic clutches, or a combination of solenoids and electronic clutches. Then, the voltages are respectively compared with at least one reference voltage to generate a plurality of comparison results. Next, at least one logic operation is performed on the comparison results to generate at least one control signal for a plurality of high-voltage motive device driving circuits. After that, the high-voltage motive devices are respectively driven by the high-voltage motive device driving circuits according to the control signal.

According to an embodiment of the present invention, the over-current protection method further includes following steps. The logic operation is performed on the comparison results to generate a main power control signal for a main power control module. Then, a main power off control signal is generated by the main power control module for a main power circuit according to the main power control signal, so that the main power circuit turns off a high-voltage motive device voltage source supplied by the main power circuit according to the main power off control signal.

According to an embodiment of the present invention, the step of generating the main power off control signal further includes following steps. First, the main power control signal is integrated to generate an integrated voltage. Then, the integrated voltage is compared with the predetermined voltage to generate the main power off control signal.

As described above, the present invention provides an over-current protection device for multiple high-voltage motive devices and a method thereof, wherein when at least one of a plurality of high-voltage motive devices fails, driving circuits of the high-voltage motive devices and the main power circuit are automatically turned off, or some of the driving circuits and the main power circuit are sequentially turned off so that a multifunction printer (MFP) can be protected in real time. Thereby, sheet metals on the high-voltage motive devices can be removed and accordingly the fabrication cost of the MFP can be reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In an embodiment of the present invention, an over-current protection device for multiple high-voltage motive devices is provided. When a multifunction printer (MFP) fails, the over-current protection device can carry out over-current protection on high-voltage motive devices, such as solenoids or electronic clutches.

Figure 1:
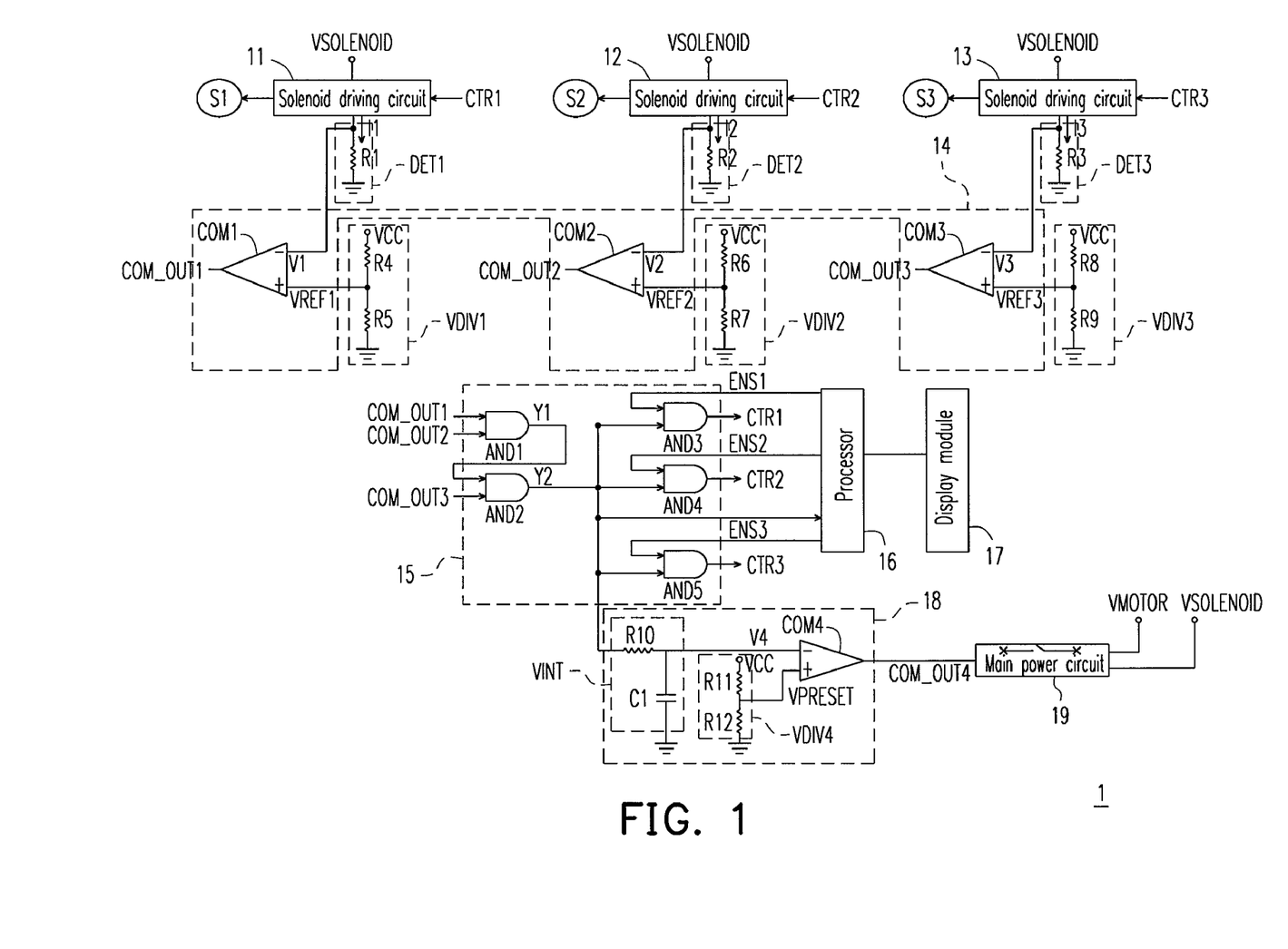
FIG. 1 is a diagram of an over-current protection device for multiple high-voltage motive devices according to an embodiment of the present invention.

FIG. 1 is a diagram of an over-current protection device for multiple high-voltage motive devices according to an embodiment of the present invention. Referring to FIG. 1, the over-current protection device 1 includes a comparison module 14 and a logic operation module 15. In the present embodiment, the high-voltage motive devices are described as solenoids S1-S3. However, the over-current protection device 1 provided by the present invention is not only applied to the solenoids S1-S3 and may also be applied to electronic clutches. In addition, even though FIG. 1 illustrates the solenoids S1-S3, the number of the solenoids is not limited in the present invention.

The solenoids S1-S3 are respectively driven by solenoid driving circuits 11-13. The solenoid driving circuits 11-13 receive a solenoid voltage VSOLENOID that is higher than the supply voltages of other elements and respectively determine whether to supply driving voltages or driving currents to the solenoids S1-S3 according to control signals CTR1-CTR3. The solenoid current detection circuits DET1-DET3 are respectively connected to the solenoids S1-S3, and which detect the operating currents I1-I3 of the solenoids S1-S3 and respectively generate voltages V1-V3 according to the operating currents I1-I3. In the present embodiment, the solenoid current detection circuits DET1-DET3 are respectively composed of resistors R1-R3. However, the implementation of the solenoid current detection circuits DET1-DET3 is not limited in the present invention.

The comparison module 14 receives the voltages V1-V3 generated from the operating currents I1-I3 of the solenoids S1-S3 and respectively compares the voltages V1-V3 with reference voltages VREF1-VREF3 to generate comparison results COM_OUT1-COM_OUT3. In the present embodiment, the solenoid current detection circuits DET1-DET3 and the comparison module 14 are separately designed. However, in an actual application, the comparison module 14 may include the solenoid current detection circuits DET1-DET3.

In addition, the comparison module 14 includes a plurality of comparators COM1-COM3, wherein the comparators COM1-COM3 are implemented with operational amplifiers. The comparator COM1 compares the voltage V1 received from the negative input terminal thereof with the reference voltage VREF1 received from the positive input terminal thereof to output the comparison result COM_OUT1. The comparator COM2 compares the voltage V2 received from the negative input terminal thereof with the reference voltage VREF2 received from the positive input terminal thereof to output the comparison result COM_OUT2. The comparator COM3 compares the voltage V3 received from the negative input terminal thereof with the reference voltage VREF3 received from the positive input terminal thereof to output the comparison result COM_OUT3. It should be noted that the implementation of the comparison module 14 is not limited to that illustrated in FIG. 1.

Additionally, the reference voltages VREF1-VREF3 may be generated by the reference voltage generators VDIV1-VDIV3. The reference voltage generator VDIV1 includes resistors R4 and R5 that are connected in series. The reference voltage generator VDIV1 receives a system voltage VCC and generates the reference voltage VREF1 according to the ratio between the resistors R4 and R5. Similarly, the reference voltage generator VDIV2 generates the reference voltage VREF2 according to the ratio between the resistors R6 and R7, and the reference voltage generator VDIV3 generates the reference voltage VREF3 according to the ratio between the resistors R8 and R9. The resistances of the resistors R4-R9 can be determined according to the current limits of the solenoids S1-S3. In other words, different reference voltages VREF1-VREF3 are generated according to the current limits of the solenoids S1-S3. In the present embodiment, the reference voltage generators VDIV1-VDIV3 are implemented outside of the comparison module 14. However, in an actual application, the reference voltage generators VDIV1-VDIV3 may also be implemented in the comparison module 14.

Next, the logic operation module 15 receives the comparison results COM_OUT1-COM_OUT3 and performs at least one logic operation according to the comparison results COM_OUT1-COM_OUT3 to generate a plurality of control signals CTR1-CTR3 for the solenoid driving circuits 11-13. The control signals CTR1-CTR3 may be the same control signal or different control signals. The logic operations performed for generating the control signals CTR1-CTR3 may be the same logic operation or different logic operations.

In the present embodiment, the over-current protection device 1 further includes a main power control module 18, and the logic operation module 15 generates a main power control signal Y2 for the main power control module 18 according to the comparison results COM_OUT1-COMOUT3. The main power control module 18 generates a main power off control signal COM_OUT4 for a main power circuit 19 according to the main power control signal Y2, so as to control the main power circuit 19 to stop supplying the solenoid voltage VSOLENOID (an electronic clutch voltage VCLUTCH if the high-voltage motive devices are electronic clutches) and a motor voltage VMOTOR.

In FIG. 1, the over-current protection device 1 may further include a processor 16. The processor 16 receives a power-off indication signal Y2 (in another embodiment, the processor 16 may also receive a power-off indication signal Y1), wherein the power-off indication signal Y2 indicates which solenoids fail. Besides, the processor 16 generates prompt signals ENS1-ENS3 according to the power-off indication signal Y2. The logic operation module 15 generates the control signals CTR1-CTR3 according to the prompt signals ENS1-ENS3 and the power-off indication signal Y2.

The over-current protection device 1 may further include a display module 17. The processor 16 generates a warning signal for the display module 17 according to the power-off indication signal Y2. The display module 17 displays error states of the solenoids S1-S3 according to the warning signal. Accordingly, a user or a maintenance guy can eliminate the problem according to the error states of the solenoids S1-S3 displayed by the display module 17.

In the present embodiment, the logic operation module 15 includes a plurality of logic AND gates AND1-AND5. The logic AND gate AND1 performs a logic AND operation on the comparison results COM_OUT1 and COM_OUT2 to output the power-off indication signal Y1. The logic AND gate AND2 performs a logic AND operation on the comparison result COM_OUT3 and the power-off indication signal Y1 to output the power-off indication signal Y2, wherein the power-off indication signal Y2 is also the main power control signal Y2 output to the main power control module 18. The logic AND gate AND3 performs a logic AND operation on the prompt signal ENS1 and the power-off indication signal Y2 to output the control signal CTR1. The logic AND gate AND4 performs a logic AND operation on the prompt signal ENS2 and the power-off indication signal Y2 to output the control signal CTR2. The logic AND gate AND5 performs a logic AND operation on the prompt signal ENS3 and the power-off indication signal Y2 to output the control signal CTR3.

No extra operating currents I1-I3 will be produced when the solenoids S1-S3 operate normally. In this case, the comparison results COM_OUT1-COM_OUT3 are logic high level signals and the power-off indication signal Y2, the control signals CTR1-CTR3, the prompt signals ENS1-ENS3, and the main power off control signal COM_OUT4 are all logic high level signals. Thus, the solenoid driving circuits 11-13 respectively drive the solenoids S1-S3.

However, when one of the solenoids (for example, the solenoid S1) fails, the comparison result COM_OUT1 becomes a logic low level signal, and the power-off indication signal Y2, the control signals CTR1-CTR3, the prompt signals ENS1-ENS3, and the main power off control signal COM_OUT4 all become logic low level signals.

Thus, the solenoid driving circuits 11-13 are disabled and cannot drive the solenoids S1-S3. Meanwhile, the main power circuit 19 is also disabled and stops supplying the motor voltage VMOTOR and the solenoid voltage VSOLENOID.

In the present embodiment, the solenoid driving circuits 11-13 and the main power circuit 19 are all turned off if one solenoid fails. However, it should be noted that the present invention is not limited thereto. In another embodiment, the logic operation module 15 may also be implemented by using a plurality of different logic gates so that all or some of the solenoid driving circuits 11-13 are disabled first to protect the corresponding ones of the solenoids S1-S3 and the main power circuit 19 is turned off after that. In short, the logic operation module 15 can be designed according to the order in which the elements are intended to be protected.

The main power control module 18 includes an integrator VINT and a comparator COM4. The integrator VINT receives the main power control signal Y2 and generates an integrated voltage V4. The integrator VINT may be implemented by using a resistor R10 and a capacitor C1. However, the implementation of the integrator VINT is not limited in the present invention, and the integrator VINT may also be implemented differently. The comparator COM4 compares a predetermined voltage VPRESET received by the positive input terminal thereof and the integrated voltage V4 received by the negative input terminal thereof to generate the main power off control signal COM_OUT4. The predetermined voltage VPRESET may be generated by a reference voltage generator VDIV4. The reference voltage generator VDIV4 includes two resistors R11 and R12 that are connected in series. As described above, the implementation of the reference voltage generator VDIV4 is not limited in the present invention. In addition, the comparator COM4 may also be implemented in the comparison module 14 instead of as a separate comparator.

Figure 2:
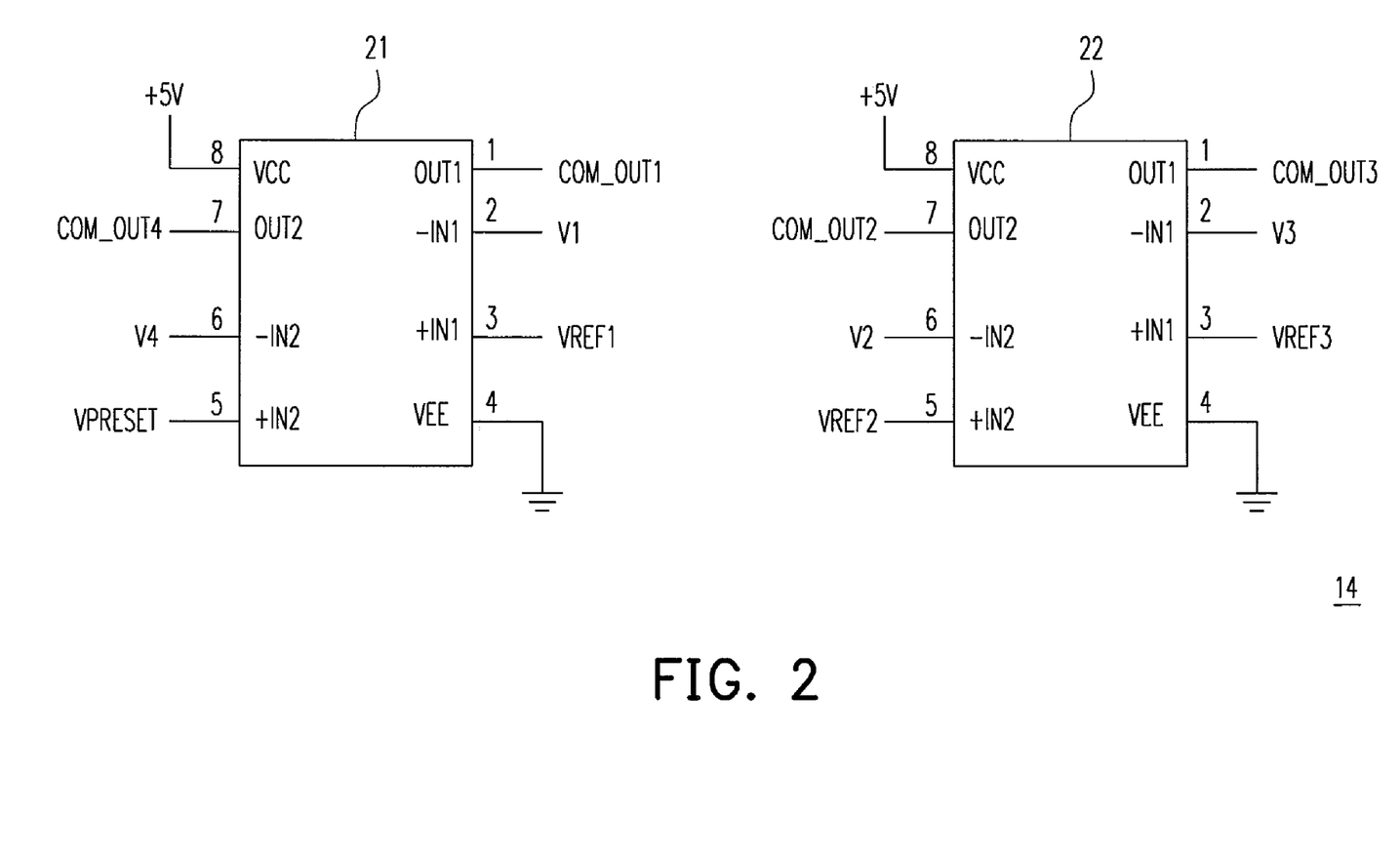
FIG. 2 is a diagram of a comparison module according to an embodiment of the present invention.

FIG. 2 is a diagram of a comparison module according to an embodiment of the present invention. Referring to FIG. 2, the comparison module 14 can be implemented by using two existing comparator chips 21 and 22 in the market. In the present embodiment, the comparator COM4 in FIG. 1 is also implemented in the comparison module 14 to reduce the surface area and the fabrication cost of the chip. The comparator chip 21 or 22 includes two comparators and has 8 pins, wherein the 8 pins are respectively defined as an output terminal OUT1 of the first comparator, a negative input terminal −IN1 of the first comparator, a positive input terminal +IN1 of the first comparator, a ground terminal VEE, a positive input terminal +IN2 of the second comparator, a negative input terminal −IN2 of the second comparator, an output terminal OUT2 of the second comparator, and a system voltage VCC.

The 8 pins of the comparator chip 21 are respectively connected to the comparison result COM_OUT1, the voltage V1, the reference voltage VREF1, the ground, the predetermined voltage VPRESET, the voltage V4, the main power off control signal COM_OUT4, and a 5V voltage. The 8 pins of the comparator chip 22 are respectively connected to the comparison result COM_OUT3, the voltage V3, the reference voltage VREF3, the ground, the reference voltage VREF2, the voltage V2, the comparison result COM_OUT2, and the 5V voltage. Herein the comparator COM4 and the comparator COM1 of the main power control module 18 are implemented in the same comparator chip 21 so that no other comparator chip is required.

Figure 3:
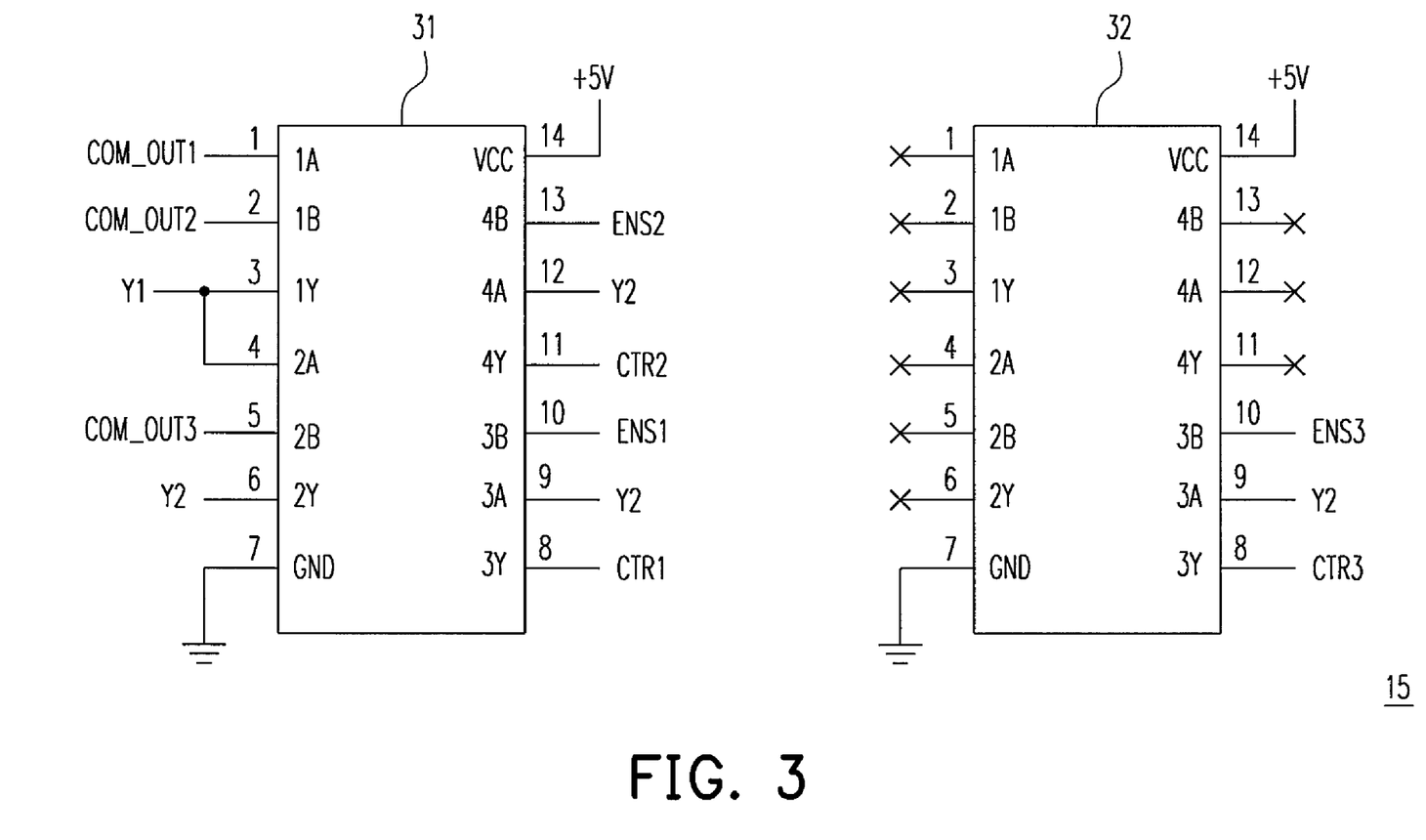
FIG. 3 is a diagram of a logic operation module according to an embodiment of the present invention.

FIG. 3 is a diagram of a logic operation module according to an embodiment of the present invention. Referring to FIG. 3, the logic operation module 15 in FIG. 1 can be implemented by using two existing logic AND gate chips 31 and 32 in the markets. The logic AND gate chip 31 or 32 has 4 logic AND gates and 14 pins, wherein the 14 pins are respectively defined as an input terminal 1A of the first logic AND gate, an input terminal 1B of the first logic AND gate, an output terminal 1Y of the first logic AND gate, an input terminal 2A of the second logic AND gate, an input terminal 2B of the second logic AND gate, an output terminal 2Y of the second logic AND gate, a ground terminal GND, an output terminal 3Y of the third logic AND gate, an input terminal 3A of the third logic AND gate, an input terminal 3B of the third logic AND gate, an output terminal 4Y of the fourth logic AND gate, an input terminal 4A of the fourth logic AND gate, an input terminal 4b of the fourth logic AND gate, and the system voltage VCC.

The 14 pins of the logic AND gate chip 31 are respectively connected to the comparison result COM_OUT1, the comparison result COM_OUT2, the power-off indication signal Y1, the power-off indication signal Y1, the comparison result COM_OUT3, the power-off indication signal Y2, the ground, the control signal CTR1, the power-off indication signal Y2, the prompt signal ENS1, the control signal CTR2, the power-off indication signal Y2, the prompt signal ENS2, and the 5V voltage. The $1^{st}$-$6^{th}$ and $11^{th}$-$13^{th}$ pins of the logic AND gate chip 32 are respectively floated and not in use, and the $7^{th}$-$10^{th}$ pins and the $14^{th}$ pin thereof are respectively connected to the ground, the control signal CTR3, the power-off indication signal Y2, the prompt signal ENS3, and the 5V voltage.

Figure 4A:
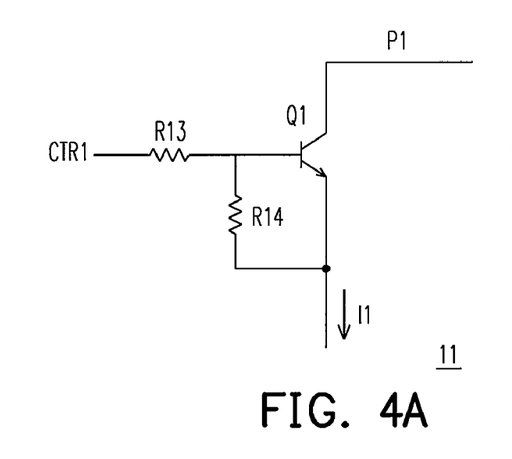
FIGS. 4A-4C are respectively partial circuit diagrams of solenoid driving circuits in FIG. 1.
Figure 4B:
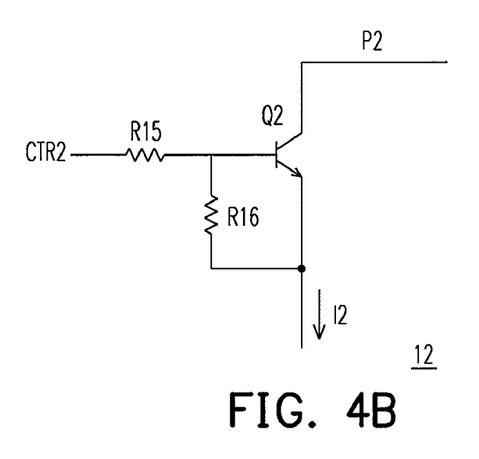
Figure 4C:
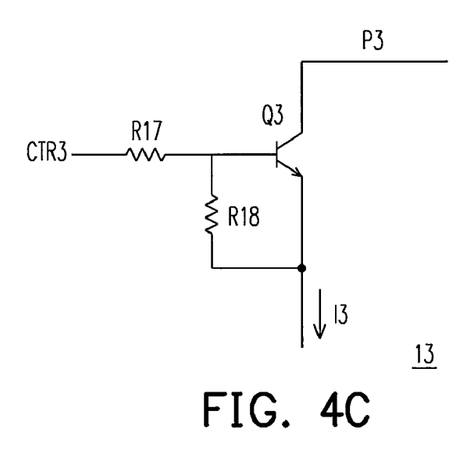
Figure 4D:
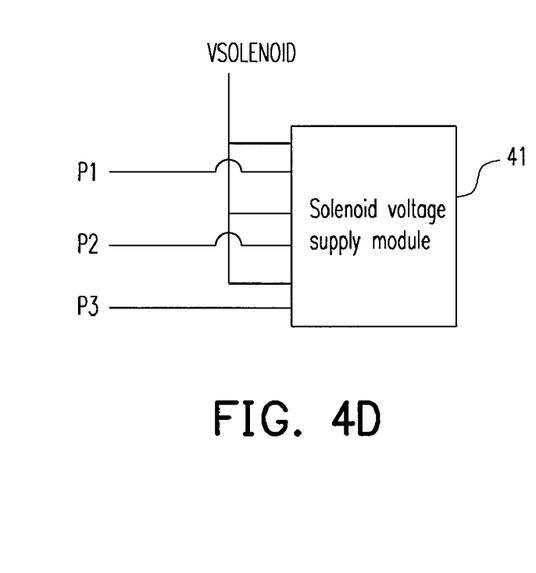
FIG. 4D is a diagram of a solenoid voltage supply module according to an embodiment of the present invention.

FIGS. 4A-4C are respectively partial circuit diagrams of solenoid driving circuits in FIG. 1. Referring to FIGS. 4A-4C, the solenoid driving circuit 11 includes a transistor Q1 and resistors R13 and R14. Similarly, the solenoid driving circuit 12 includes a transistor Q2 and resistors R15 and R16, and the solenoid driving circuit 13 includes a transistor Q3 and resistors R17 and R18. The transistors Q1-Q3 are bipolar junction transistors (BJTs). The drains of the transistors Q1-Q3 respectively receive the voltages P1-P3 generated according to the solenoid voltage VSOLENOID, and the gates thereof respectively receive the control signals CTR1-CTR3. When the control signals CTR1-CTR3 are logic low level signals, the transistors Q1-Q3 are turned off so that no extra operating currents I1-I3 is produced. FIG. 4D is a diagram of a solenoid voltage supply module according to an embodiment of the present invention. Referring to FIG. 4D, the voltages P1-P3 in FIGS. 4A-4C can be generated by the solenoid voltage supply module 41. The solenoid voltage supply module 41 is an existing power connector in the market, and which receives the solenoid voltage VSOLENOID and generates the voltages P1-P3.

Figure 5:
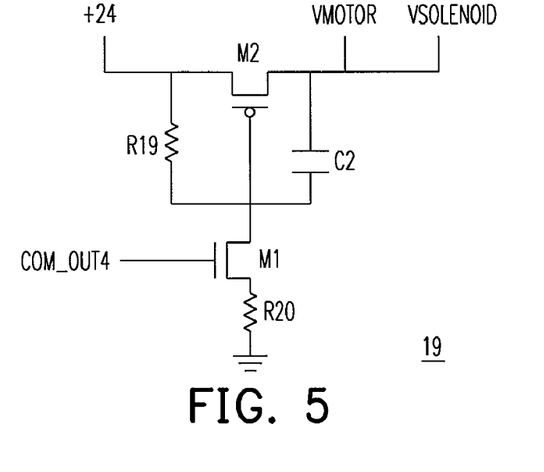
FIG. 5 is a diagram of a main power circuit according to an embodiment of the present invention.

FIG. 5 is a diagram of a main power circuit according to an embodiment of the present invention. Referring to FIG. 5, the main power circuit 19 includes transistors M1 and M2, resistors R19 and R20, and a capacitor C2. The transistor M1 is an N-type depletion metal-oxide-semiconductor field-effect transistor (MOSFET), and the transistor M2 is a P-type enhanced MOSFET. When the main power off control signal COM_OUT4 received by the gate of the transistor M1 is a logic low level signal, the transistor M1 and the transistor M2 are turned off. Accordingly, the main power circuit 19 stops supplying the motor voltage VMOTOR and the solenoid voltage VSOLENOID.

Figure 6:
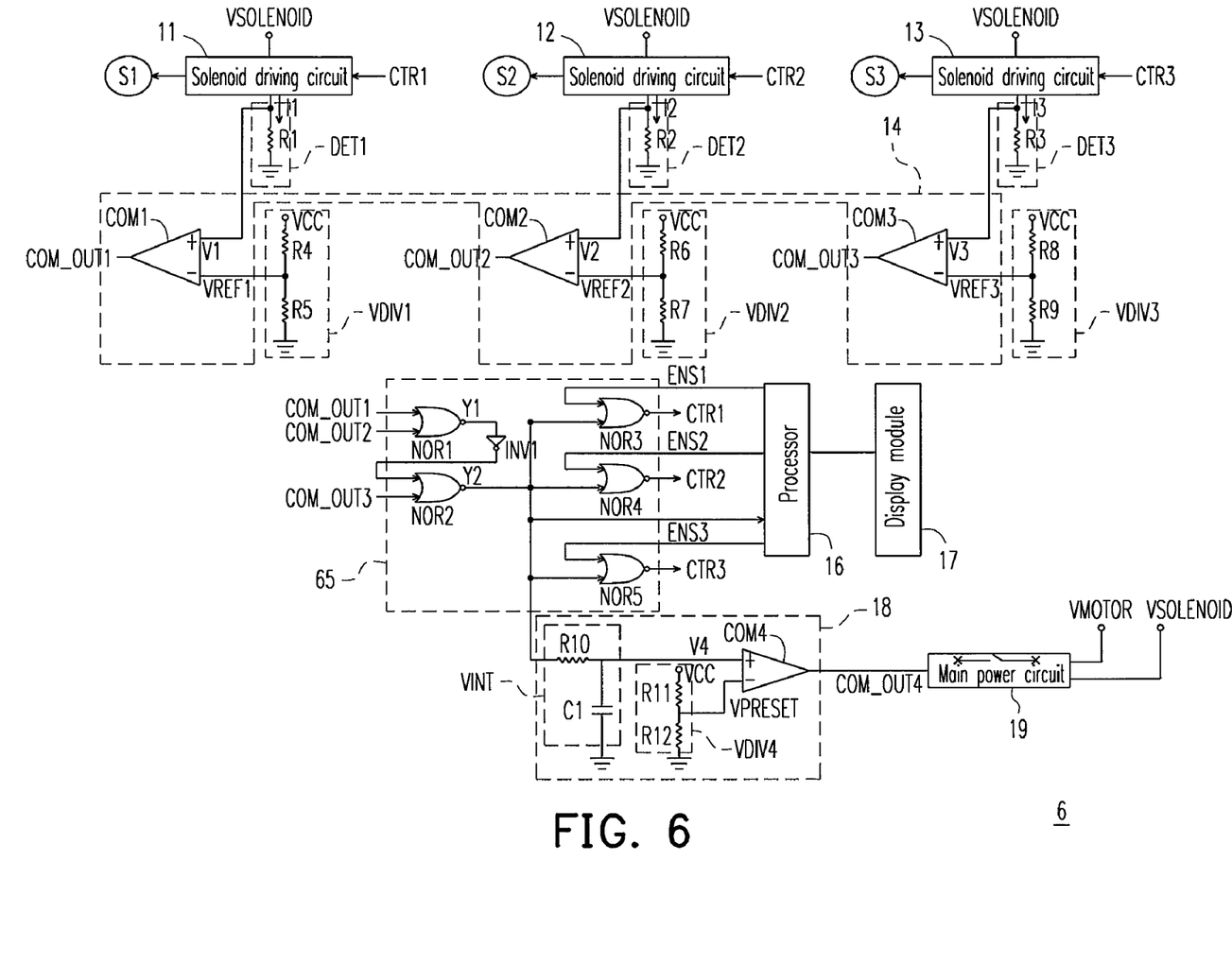
FIG. 6 is a diagram of an over-current protection device for multiple high-voltage motive devices according to another embodiment of the present invention.

FIG. 6 is a diagram of an over-current protection device for multiple high-voltage motive devices according to another embodiment of the present invention. Referring to FIG. 6, the difference between the over-current protection device 6 and the over-current protection device 1 illustrated in FIG. 1 is that the logic operation module 65 is implemented by using a plurality of logic NOR gates NOR1-NOR5 and a NOT gate INV1. Thus, the control signals CTR1-CTR3 used for disabling the solenoid driving circuits 11-13 and the main power off control signal COM_OUT4 used for disabling the main power circuit 19 are logic high level signals. The corresponding elements can be disabled since the control signals CTR1-CTR3 and the main power off control signal COM_OUT4 are logic high level signals. Thus, the positive input terminals and the negative input terminals of the comparators COM1-COM4 in FIG. 4 are reverse to the positive input terminals and the negative input terminals of the comparators COM1-COM4 in FIG. 1. For example, the positive input terminal and the negative input terminal of the comparator COM1 in FIG. 4 respectively receive the voltage V1 and the reference voltage VREF1. However, the positive input terminal and the negative input terminal of the comparator COM1 in FIG. 1 respectively receive the reference voltage VREF1 and the voltage V1.

Figure 7:
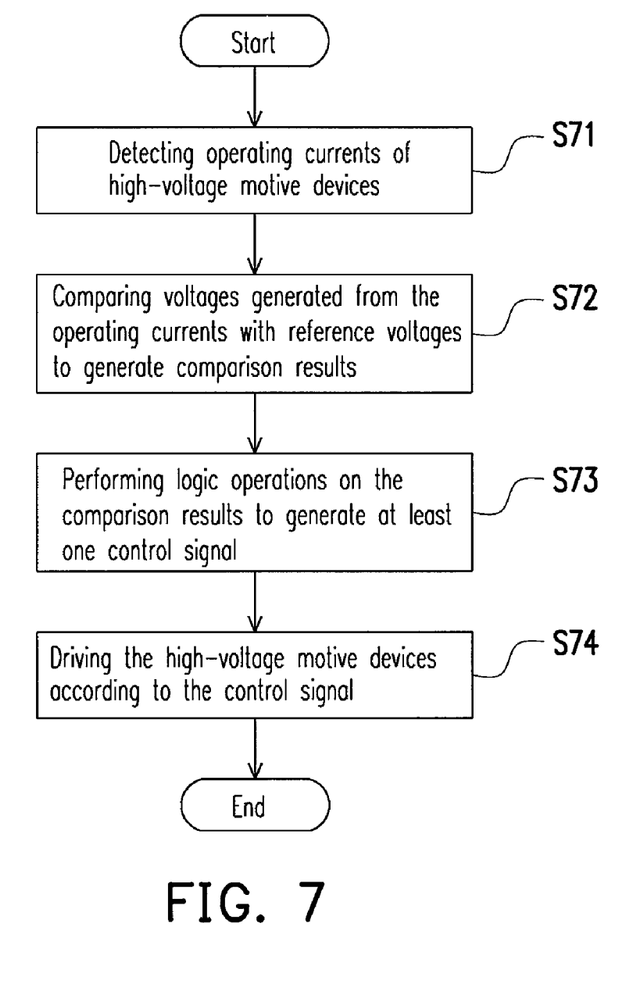
FIG. 7 is a flowchart of an over-current protection method for multiple high-voltage motive devices according to an embodiment of the present invention.

FIG. 7 is a flowchart of an over-current protection method for multiple high-voltage motive devices according to an embodiment of the present invention. Referring to FIG. 7, in step S71, the operating currents of the high-voltage motive devices are detected. Then, in step S72, the voltages generated from the operating currents of the high-voltage motive devices are compared with the reference voltages to generate the comparison results. Next, in step S73, at least one a logic operation is performed on the comparison results to generate at least one control signal. Finally, in step S74, the high-voltage motive devices are driven according to the control signal.

In summary, the present invention provides an over-current protection device for multiple high-voltage motive devices and a method thereof, wherein when at least one of a plurality of high-voltage motive devices fails, driving circuits of the high-voltage motive devices and the main power circuit are automatically turned off, or some of the driving circuits and the main power circuit are sequentially turned off so that a MFP can be protected in real time. Thereby, sheet metals on the high-voltage motive devices can be removed and accordingly the fabrication cost of the MFP can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A current protection device for multiple high-voltage motive devices, comprising:
   a comparison module, for receiving a plurality of voltages generated from a plurality of operating currents of a plurality of high-voltage motive devices and respectively comparing the voltages with at least one reference voltage to generate a plurality of comparison results, wherein the high-voltage motive devices are a plurality of solenoids, a plurality of electronic clutches, or a combination of the solenoids and the electronic clutches; and
   a logic operation module, for receiving the comparison results and generating at least one control signal for a plurality of high-voltage motive device driving circuits according to the comparison results, wherein the high-voltage motive device driving circuits respectively drives the high-voltage motive devices according to the control signal, wherein the high-voltage motive device driving circuits receive a high-voltage motive device voltage source used for the high-voltage motive devices and generates a driving voltage or a driving current, and the control signal determines whether or not to supply the driving voltage or the driving current to drive the high-voltage motive devices.

2. The current protection device according to claim 1 further comprising a main power control module, wherein the logic operation module further generates a main power control signal for the main power control module according to the comparison results, and the main power control module generates a main power off control signal for a main power circuit according to the main power control signal so that the main power circuit turns off the high-voltage motive device voltage source supplied by the main power circuit according to the main power off control signal.

3. The current protection device according to claim 2, wherein the main power control module comprises:
   an integrator, for receiving the main power control signal and generating an integrated voltage accordingly; and
   a comparator, for receiving a predetermined voltage and the integrated voltage and comparing the integrated voltage with the predetermined voltage to generate the main power off control signal.

4. The current protection device according to claim 2 further comprising a processor, wherein the logic operation module generates at least one power-off indication signal according to the comparison results, the processor outputs at least one prompt signal to the logic operation module according to the power-off indication signal, and the logic operation module generates the control signal according to the power-off indication signal and the prompt signal.

5. The current protection device according to claim 4 further comprising a display module, wherein the processor generates an warning signal according to the power-off indication signal, and the display module receives the warning signal and displays error states of the high-voltage motive devices according to the warning signal.

6. The current protection device according to claim 2, wherein when the voltage generated from the operating current of one of the high-voltage motive devices is greater than the reference voltage, the logic operation module outputs the control signal to turn off one, all, or a part of the high-voltage motive devices, or the main power control module turns off the high-voltage motive device voltage source supplied by the main power circuit.

7. The current protection device according to claim 1, wherein the logic operation module comprises at least one logic gate.

8. The current protection device according to claim 1, wherein the comparison module comprises a plurality of comparators, and the comparators respectively compare the voltages with the reference voltage and generate the comparison results.

9. The current protection device according to claim 1, wherein one of the voltages is generated by a current detector through detection of the corresponding operating current.

10. The current protection device according to claim 1, wherein the reference voltage is generated by a reference voltage generator.

11. A current protection method for multiple high-voltage motive devices, comprising:
   receiving a plurality of voltages generated from a plurality of operating currents of a plurality of high-voltage motive devices, wherein the high-voltage motive devices are a plurality of solenoids, a plurality of electronic clutches, or a combination of the solenoids and the electronic clutches;
   respectively comparing the voltages with at least one reference voltage to generate a plurality of comparison results;
   performing at least one logic operation on the comparison results to generate at least one control signal for a plurality of high-voltage motive device driving circuits; and
   respectively driving the high-voltage motive devices according to the control signal by using the high-voltage motive device driving circuits,
   wherein the high-voltage motive device driving circuits receive a high-voltage motive device voltage source used for the high-voltage motive devices and generates a driving voltage or a driving current, and the control signal determines whether or not to supply the driving voltage or the driving current to drive the high-voltage motive devices.

12. The current protection method according to claim 11 further comprising:
   performing the logic operation on the comparison results to generate a main power control signal for a main power control module; and
   generating a main power off control signal for a main power circuit according to the main power control signal by using the main power control module, so that the main power circuit turns off the high-voltage motive device voltage source supplied by the main power circuit according to the main power off control signal.

13. The current protection method according to claim 12, wherein the step of generating the main power off control signal comprises:
   integrating the main power control signal to generate an integrated voltage; and
   comparing the integrated voltage with the predetermined voltage to generate the main power off control signal.

14. The current protection method according to claim 12, wherein the step of generating the control signal comprises:
   performing the logic operation on the comparison results to generate at least one power-off indication signal for a processor;
   generating at least one prompt signal according to the power-off indication signal; and
   performing the logic operation on the power-off indication signal and the prompt signal to generate the control signal.

15. The current protection method according to claim 14 further comprising:
   performing the logic operation on the comparison results to generate a warning signal; and
   displaying error states of the high-voltage motive devices according to the warning signal.

16. The current protection method according to claim 12, wherein when the voltage generated from the operating current of one of the high-voltage motive devices is greater than the reference voltage, the control signal is used for turning off one, all, or a part of the high-voltage motive devices, or the main power control module turns off the high-voltage motive device voltage source supplied by the main power circuit.

* * * * *